(12) United States Patent
Torsner et al.

(10) Patent No.: US 9,338,690 B2
(45) Date of Patent: May 10, 2016

(54) RLC SEGMENTATION FOR CARRIER AGGREGATION

(75) Inventors: Johan Torsner, Masaby (FI); Michael Meyer, Aachen (DE); Janne Peisa, Espoo (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 893 days.

(21) Appl. No.: 13/119,815

(22) PCT Filed: Sep. 23, 2008

(86) PCT No.: PCT/SE2008/051062
§ 371 (c)(1),
(2), (4) Date: Mar. 18, 2011

(87) PCT Pub. No.: WO2010/036154
PCT Pub. Date: Apr. 1, 2010

(65) Prior Publication Data
US 2011/0164664 A1    Jul. 7, 2011

(51) Int. Cl.
*H04W 28/06* (2009.01)
*H04L 1/00* (2006.01)
*H04L 1/18* (2006.01)
*H04W 8/26* (2009.01)

(52) U.S. Cl.
CPC ............. *H04W 28/06* (2013.01); *H04L 1/0083* (2013.01); *H04L 1/1822* (2013.01); *H04L 1/1825* (2013.01); *H04L 1/1887* (2013.01); *H04W 8/26* (2013.01)

(58) Field of Classification Search
CPC .............................. H04L 1/1822; H04W 28/06
USPC ................. 370/469, 473, 474, 476, 352, 252; 709/235; 714/748; 375/295
See application file for complete search history.

(56) References Cited

U.S. PATENT DOCUMENTS

| | | | |
|---|---|---|---|
| 6,317,430 | B1 | 11/2001 | Knisely et al. |
| 2002/0110095 | A1* | 8/2002 | Jiang et al. ................... 370/328 |
| 2004/0057423 | A1* | 3/2004 | Beckmann et al. .......... 370/352 |
| 2006/0062323 | A1* | 3/2006 | Yi et al. ........................ 375/295 |
| 2007/0047451 | A1* | 3/2007 | Lohr et al. ................... 370/242 |
| 2007/0253447 | A1* | 11/2007 | Jiang ............................. 370/474 |

(Continued)

FOREIGN PATENT DOCUMENTS

| | | |
|---|---|---|
| JP | 62-163438 A | 7/1987 |
| JP | 2000-32088 A | 1/2000 |

(Continued)

OTHER PUBLICATIONS

Japanese Office Action in corresponding Japanese Application No. 2011-527765 mailed Jul. 13, 2012.
International Preliminary Report on Patentability and Written Opinion of the Searching Authority in corresponding International Application No. PCT/SE2008/051062 issued Mar. 29, 2011.

(Continued)

*Primary Examiner* — Brian D Nguyen
*Assistant Examiner* — Toan Nguyen
(74) *Attorney, Agent, or Firm* — Patent Portfolio Builders PLLC

(57) ABSTRACT

Systems, devices, methods and software according to these exemplary embodiments provide for reducing the number of different sequence numbers used to transmit radio link control, RLC, data blocks to avoid, for example, sequence number stalling. This can be accomplished by, for example, transmitting or receiving RLC protocol data unit, PDU, segments as the initial or original instance of data communication.

28 Claims, 10 Drawing Sheets

(56) References Cited

U.S. PATENT DOCUMENTS

| | | | |
|---|---|---|---|
| 2008/0043651 A1 | 2/2008 | Okamoto et al. | |
| 2008/0126562 A1* | 5/2008 | Ludwig et al. | 709/235 |
| 2008/0225893 A1* | 9/2008 | Cave et al. | 370/476 |
| 2008/0226074 A1 | 9/2008 | Sammour et al. | |
| 2009/0044067 A1* | 2/2009 | Obuchi et al. | 714/748 |
| 2009/0086646 A1* | 4/2009 | Kuchibhotla et al. | 370/252 |
| 2009/0290598 A1* | 11/2009 | Pani et al. | 370/473 |

FOREIGN PATENT DOCUMENTS

| JP | 2007-522780 A | 8/2007 |
|---|---|---|
| JP | 2007-306206 A | 11/2007 |
| JP | 2008-48325 A | 2/2008 |
| JP | 2011-215192 A | 10/2011 |

OTHER PUBLICATIONS

XP003013946, "Considerations on Segmentation/Concatenation in LTE", 3rd Generation Partnership Project (3GPP); Technical Specification Group (TSG) Radio Access Network (RAN); Working Group 2 (WG2), vol. R2-060028, Jan. 9, 2006, pp. 1-5.

Partial English Translation of Official Action dated Apr. 13, 2012 issued in corresponding Mexican Patent Application No. MX/a/2011/02880.

Japanese Office Action in corresponding Japanese Application No. 2011-527765 mailed May 16, 2013.

3GPP TS 36.322 V8.2.0 Technical Specification, "3rd Generation Partnership Project: Technical Specification Group Radio Access Network: Evolved Universal Terrestrial Radio Access (E-UTRA) Radio Link Control (RLC) Protocol Specification" (Release 8) May 2008.

* cited by examiner

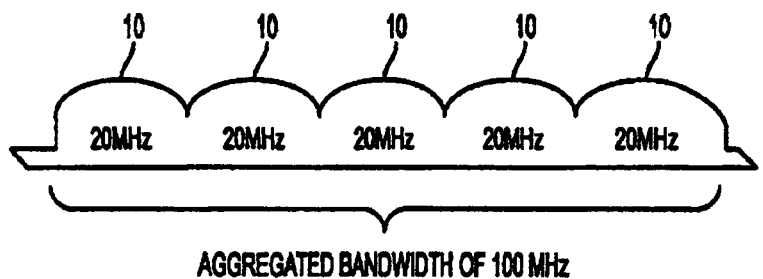
FIG. 1 Background
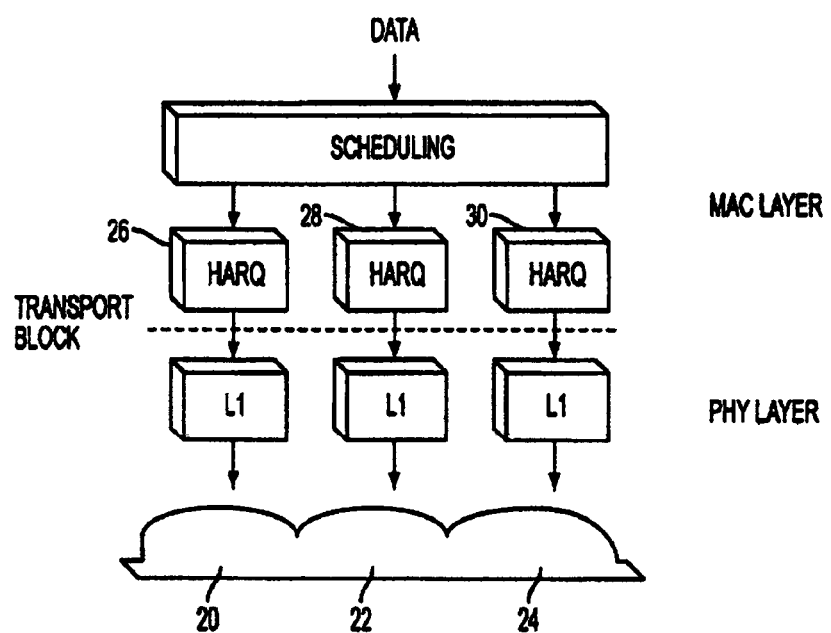
FIG. 2 Background

RLC SEGMENTATION FOR CARRIER AGGREGATION

TECHNICAL FIELD

The present invention relates generally to telecommunications systems, and in particular, to methods, systems, devices and software for segmenting data in radiocommunications systems.

BACKGROUND

Radiocommunication networks were originally developed primarily to provide voice services over circuit-switched networks. The introduction of packet-switched bearers in, for example, the so-called 2.5G and 3G networks enabled network operators to provide data services as well as voice services. Eventually, network architectures will likely evolve toward all Internet Protocol (IP) networks which provide both voice and data services. However, network operators have a substantial investment in existing infrastructures and would, therefore, typically prefer to migrate gradually to all IP network architectures in order to allow them to extract sufficient value from their investment in existing infrastructures. Also to provide the capabilities needed to support next generation radiocommunication applications, while at the same time using legacy infrastructure, network operators could deploy hybrid networks wherein a next generation radiocommunication system is overlaid onto an existing circuit-switched or packet-switched network as a first step in the transition to an all IP-based network. Alternatively, a radiocommunication system can evolve from one generation to the next while still providing backward compatibility for legacy equipment.

One example of such an evolved network is based upon the Universal Mobile Telephone System (UMTS) which is an existing third generation (3G) radiocommunication system that is evolving into High Speed Packet Access (HSPA) technology. Yet another alternative is the introduction of a new air interface technology within the UMTS framework, e.g., the so-called Long Term Evolution (LIE) technology. Target performance goals for LTE systems include, for example, support for 200 active calls per 5 MHz cell and sub 5 ms latency for small IP packets. Each new generation, or partial generation, of mobile communication systems add complexity and abilities to mobile communication systems and this can be expected to continue with either enhancements to proposed systems or completely new systems in the future.

The LTE Rel-8 standard has recently been standardized, supporting bandwidths up to 20 MHz. However, in order to meet the upcoming IMT-Advanced requirements, 3GPP has initiated work on LTE-Advanced. One aspect of LTE-Advanced is to support bandwidths larger than 20 MHz in a manner which assures backward compatibility with LTE Rel-8, including spectrum compatibility. This implies that an LTE-Advanced carrier, which is wider than 20 MHz, should appear as a number of LTE carriers to an LTE Rel-8 terminal. Each such carrier can be referred to as a "component carrier".

For early LTE-Advanced deployments, it is expected that there will be a smaller number of LTE-Advanced-capable terminals in operation as compared to many LTE legacy terminals in operation. Therefore, it is necessary to assure an efficient use of a wide carrier also for legacy terminals, i.e., that it is possible to implement carriers where legacy terminals can be scheduled in all parts of the wideband LTE-Advanced carrier. One way to achieve this objective is by means of carrier aggregation. Carrier aggregation implies that, for example, an LTE-Advanced terminal can receive multiple component carriers, where the component carriers have, or at least have the possibility to have, the same structure as a Rel-8 carrier. An example of carrier aggregation is illustrated in FIG. 1, wherein five 20 MHz component carriers 10 are aggregated to form a single wideband carrier.

LTE systems use hybrid-ARQ where, after receiving downlink data in a subframe, the terminal attempts to decode that data and reports to the base station whether the decoding was successful (ACK) or not (NAK). In the case of an unsuccessful decoding attempt, the base station can retransmit the erroneous data. Downlink transmissions are dynamically scheduled, i.e., in each subframe the base station transmits control information on which terminals are supposed to receive data and upon which resources in the current downlink subframe. This control signaling is typically transmitted in the first 1, 2 or 3 OFDM symbols in each subframe. A terminal will thus listen to the control channel and, if it detects a downlink assignment addressed to it, the terminal will decode the data and generate feedback in response to the transmission in the form of an ACK or a NAK depending on whether the data was decoded correctly or not.

The HARQ protocol employed in LTE systems uses a number of HARQ processes each having their own identification (ID), where a HARQ process is essentially a pointer to a logical buffer in the receiver. When retransmissions are performed for a higher layer PDU, they are transmitted in the same HARQ process and the receiver knows (from the HARQ process ID) that the retransmissions should be combined with each other. When the transmitter has received an ACK for the transmitted data it can start sending a new transmission in the HARQ process and indicates that to the receiver with a new data indicator on the L1/2 control channel. A stop and wait protocol is used for each HARQ process but since transmissions can be ongoing in multiple, staggered HARQ processes simultaneously a continuous transmission is possible. The number of HARQ processes needed to achieve a continuous transmission depends on, among other things, the processing requirements in the eNodeB and the user equipment (UE). For LTE systems, about 8 HARQ processes are needed to provide frequency division duplex (FDD) operation.

One possibility for implementing carrier aggregation is to perform coding and hybrid-ARQ retransmissions on a per component carrier basis. An example of this type of carrier aggregation is illustrated in FIG. 1, where data to be transmitted to a given terminal is transmitted on three component carriers 20, 22 and 24. In the existing LTE structure, this technique would correspond to having a transport block (or two transport blocks in case of spatial multiplexing) per component carrier. The structure in FIG. 2 uses multiple, independent hybrid-ARQ entities 26, 28 and 30 to implement the HARQ processes in the medium access control (MAC) layer. For hybrid-ARQ operation, acknowledgements informing the transmitter regarding whether the reception of a transport block was successful or not are needed. One way to implement such acknowledgements would be to transmit multiple acknowledgement messages, e.g., one per component carrier (in the case where spatial multiplexing is employed, an acknowledgement message would correspond to two bits as there are two transport blocks on a component carrier in the first release of LTE, however in the absence of spatial multiplexing, an acknowledgement message is a single bit as there is only a single transport block per component carrier), but also other implementations are possible.

If carrier aggregation is performed as shown, for example, in FIG. 2, this means that several transport blocks (TBs) may be transmitted per transmission time interval (TTI). If, for example, 20 MHz carriers are aggregated to a total bandwidth of 100 MHz to achieve a 1 Gbps peak rate, 5 TBs per TTI need to be transmitted. If spatial multiplexing is used this increases to 10 TBs per TTI with the current LTE solution, which uses two TBs per TTI when performing spatial multiplexing. If the solution for spatial multiplexing is modified in future releases, the number of TBs per TTI may increase even further. With the current protocol structure in LTE, e.g., as described in the standards specification 3GPP 36.322 entitled "Evolved Universal Terrestrial Radio Access (E-UTRA); Radio Link Control (RLC) protocol specification", where one RLC PDU is transmitted per TB this implies that many RLC PDUs may need to be transmitted per TTI, which quickly consumes RLC sequence numbers (e.g., 10 sequence numbers per TTI). RLC segmentation for LTE is discussed in more detail below. Thus carrier aggregation may, in some situations, result in the undesirable result of stalling of the RLC protocol since only half of the sequence number (SN) space may be outstanding (transmitted but not yet acknowledged) at any given time to ensure that there is no SN ambiguity between a new transmission and a retransmission for a particular SN.

SUMMARY

Systems, devices, methods and software according to these exemplary embodiments provide for reducing the number of different sequence numbers used to transmit radio link control, RLC, data blocks to avoid, for example, sequence number stalling. This can be accomplished by, for example, transmitting or receiving RLC protocol data unit, PDU, segments as the initial or original instance of data communication.

According to one exemplary embodiment, a method for communicating in a network includes the steps of sizing at least one service data unit, SDU, into a first plurality of radio link control, RLC, protocol data unit, PDU, segments for the initial transmission of the at least one SDU, and transmitting the first plurality of RLC PDU segments.

According to another exemplary embodiment, a communications node includes a processor adapted to size at least one service data unit, SDU, into a first plurality of radio link control, RLC, protocol data unit, PDU, segments for the initial transmission of the at least one SDU, a transceiver, connected to the processor, adapted to transmit the first plurality of RLC PDU segments, and a memory device, connected to the processor, adapted to store the first plurality of RLC PDU segments.

According to yet another exemplary embodiment, a method for communicating in a network includes the step of receiving a first plurality of radio link control, RLC, protocol data unit, PDU, segments as an initial transmission of data.

According to still another exemplary embodiment, a communications node includes a transceiver adapted to receive a first plurality of radio link control, RLC, protocol data unit, PDU, segments as the original transmission of data associated therewith, a memory device adapted to store the first plurality of RLC PDU segments, and a processor, connected to the transceiver and the memory device, adapted to repackage the RLC PDU segments into output data.

BRIEF DESCRIPTION OF THE DRAWINGS

The accompanying drawings illustrate exemplary embodiments, wherein:

FIG. 1 depicts carrier aggregation;
FIG. 2 depicts carrier aggregation with independent hybrid automatic retransmission request (HARQ) entities.

DETAILED DESCRIPTION

The following detailed description of the exemplary embodiments refers to the accompanying drawings. The same reference numbers in different drawings identify the same or similar elements. Also, the following detailed description does not limit the invention. Instead, the scope of the invention is defined by the appended claims. The following embodiments are discussed, for simplicity, with regard to the terminology and structure of LTE systems. However, the embodiments to be discussed next are not limited to LTE systems but may be applied to other telecommunications systems.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

One solution to the SN stalling problem described above is to increase the SN space in the RLC entity. However, this solution may be unattractive for some implementations since it implies a new header structure, i.e., more bits to be used for sequence numbers. Accordingly, it would also be desirable to support very high bitrates in such communication systems (e.g., 1 Gbps and beyond) with a minimum of changes to the existing RLC protocol.

Figure 3:
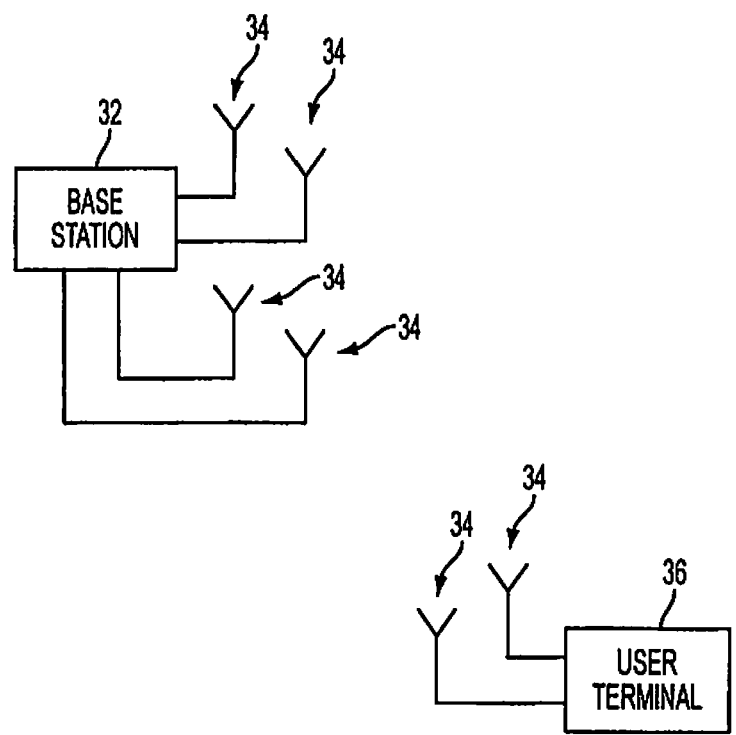
FIG. 3 illustrates elements of a radiocommunication system according to exemplary embodiments.
Figure 4:
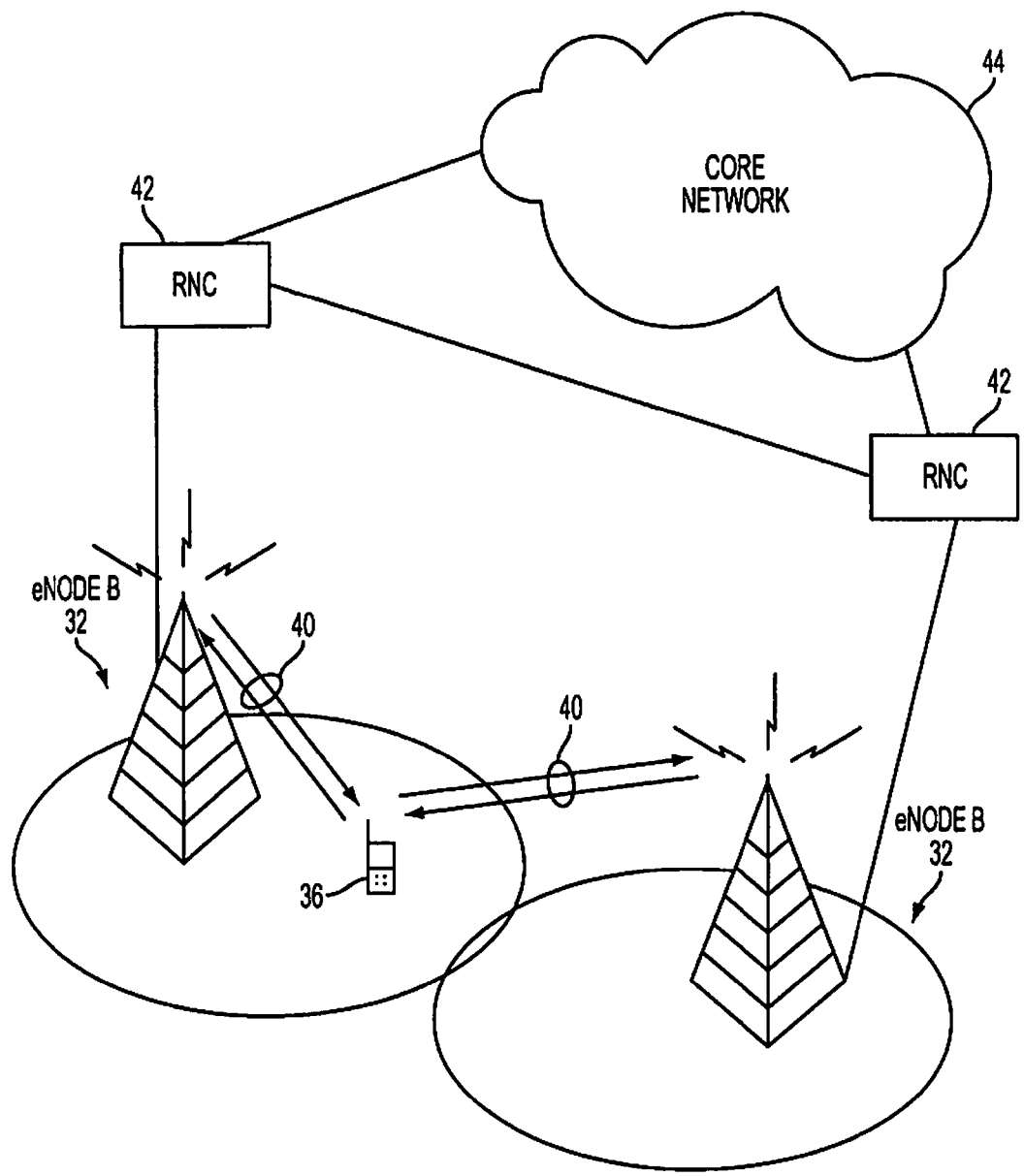
FIG. 4 shows the elements of the radiocommunication system of FIG. 3 connected to other communication nodes.

To provide some context for the following exemplary embodiments related to the sizing of RLC data blocks and associated signaling, consider the exemplary radiocommunication system as shown from two different perspectives in FIGS. 3 and 4, respectively. To increase the transmission rate of the systems, and to provide additional diversity against fading on the radio channels, modern wireless communication systems include transceivers that use multi-antennas (often referred to as a MIMO systems). The multi-antennas may be distributed to the receiver side, to the transmitter side and/or provided at both sides as shown in FIG. 3. More specifically, FIG. 3 shows a base station 32 having four antennas 34 and a user terminal (also referred to herein as "user equipment" or "UE") 36 having two antennas 34. The number of antennas shown in FIG. 3 is exemplary and is not intended to limit the actual number of antennas used at the base station 32 or at the user terminal 36 in the exemplary embodiments to be discussed below. Additionally, the term "base station" is used herein as a generic term. As will be appreciated by those skilled in the art, in the LTE architecture an evolved NodeB (eNodeB) may correspond to the base station, i.e., a base station is a possible implementation of the eNodeB. However, the term "eNodeB" is also broader in some senses than the conventional base station since the eNodeB refers, in general, to a logical node. The term "base station" is used herein as inclusive of a base station, a NodeB, an eNodeB or other nodes specific for other architectures. An eNodeB in an LTE system handles transmission and reception in one or several cells, as shown for example in FIG. 4.

FIG. 4 shows, among other things, two eNodeBs 34 and one user terminal 36. The user terminal 36 uses dedicated channels 40 to communicate with the eNodeB(s) 34, e.g., by transmitting or receiving RLC PDU segments as according to exemplary embodiments described below. The two eNodeBs 34 are connected to corresponding Radio Network Controllers (RNC) 42. Although not shown as such in FIG. 4, it will be appreciated that each RNC 42 may control more than one eNodeB 32. The RNCs 42 are connected to a Core Network 44.

Figure 5:
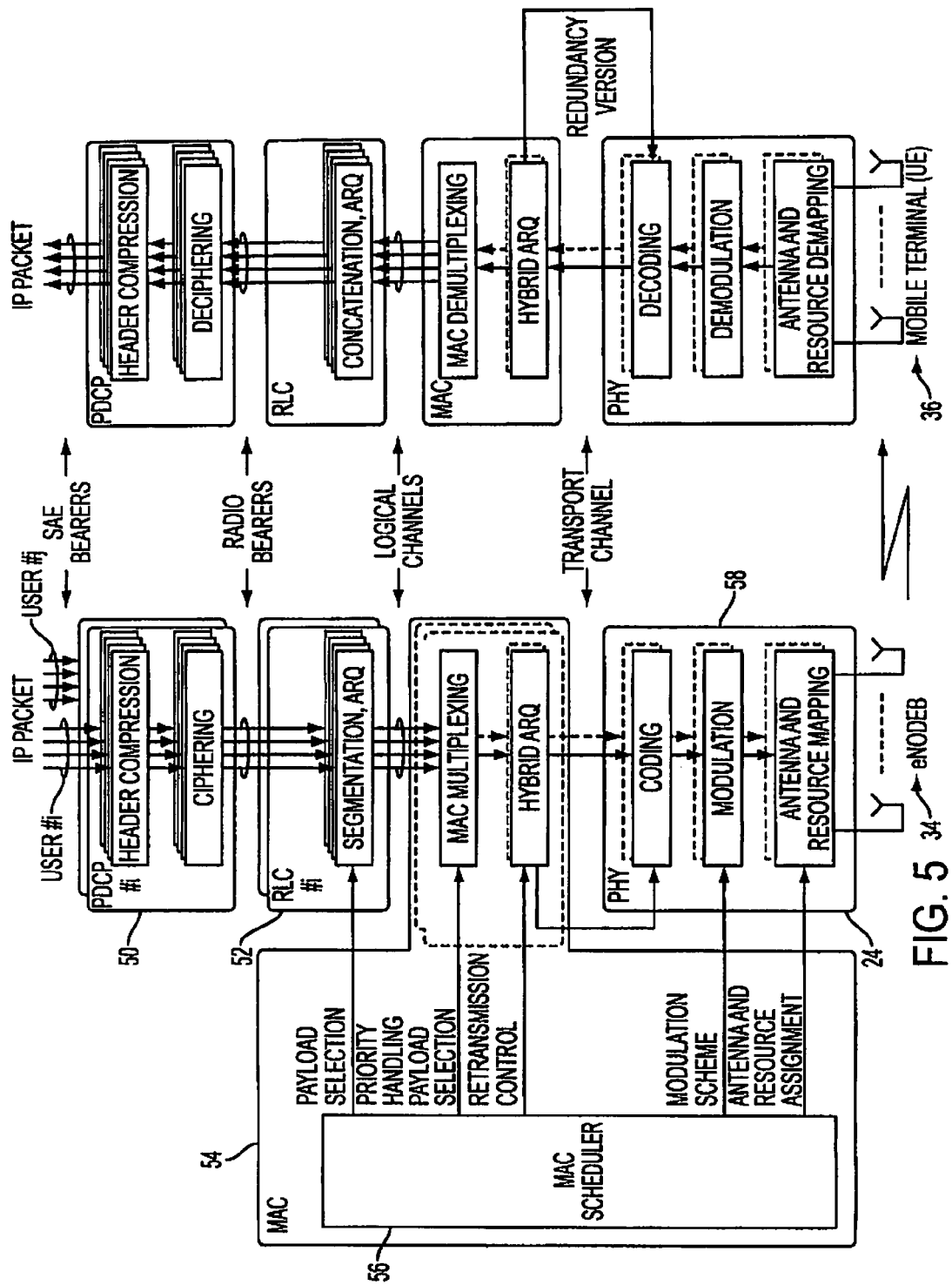
FIG. 5 illustrates entities associated with processing data in communication nodes according to exemplary embodiments.

One exemplary LTE architecture for processing data for transmission by an eNodeB 34 to a UE 36 (downlink) is shown in FIG. 5. Therein, data to be transmitted by the eNodeB 34 (e.g., IP packets) to a particular user is first processed by a packet data convergence protocol (PDCP) entity 50 in which the IP headers are (optionally) compressed and ciphering of the data is performed. The radio link control (RLC) entity 52 handles, among other things, segmentation of (and/or concatenation of) the data received from the PDCP entity 50 into protocol data units (PDUs) This function of the RLC 52 is of particular interest for the present application and is discussed in more detail below. Additionally, the RLC entity 52 provides a retransmission protocol (ARQ) which monitors sequence number status reports from its counterpart RLC entity in the UE 36 to selectively retransmit PDUs as requested. The medium access control (MAC) entity 54 is responsible for uplink and downlink scheduling via scheduler 56, as well as the hybrid-ARQ processes discussed above. A physical (PHY) layer entity 58 takes care of coding, modulation, and multi-antenna mapping, among other things. Each entity shown in FIG. 5 provides outputs to, and receives inputs from, their adjacent entities by way of bearers or channels as shown. The reverse of these processes are provided for the UE 36 as shown in FIG. 5 for the received data.

The MAC entity 54 offers services to the RLC entity 52 in the form of logical channels, as shown in FIG. 5. These logical channels, e.g., control channels and traffic channels, can be defined based on the type of information that they carry. For an exemplary LTE system, such logical channels include, for example, a broadcast control channel (BCCH), a paging control channel (PCCH), a dedicated control channel (DCCH), a multicast control channel (MCCH), a dedicated traffic channel (DTCH) and a multicast traffic channel (MTCH). As mentioned briefly above, the RLC protocol in LTE can be used to segment and concatenate higher layer service data units (SDUs) into PDUs of appropriate size to be submitted to the MAC entity 54 for transmission. The MAC entity 54 indicates the chosen TB size to the RLC entity 52 for each transmission opportunity such that the RLC 52 can segment/concatenate the higher layer SDUs into RLC PDUs of a size that matches the TB size (which in turn is selected based on the channel conditions). The RLC 52 performs retransmissions upon reception of a status report containing negative acknowledgements for one or more RLC PDUs. Since the radio conditions may change between the time of transmission and subsequent retransmission of a PDU, there is a risk that the PDU that needs to be retransmitted is too large for the available TB size at the time of retransmission. In this case, the RLC 52 performs a re-segmentation, which means that a previously created RLC PDU is split into several smaller RLC PDU segments. Each RLC PDU segment gets the same RLC sequence number as the original RLC PDU and in addition a segmentation offset is used in the header of each RLC PDU segment to indicate which part of the original RLC PDU that the RLC PDU segment contains.

For one logical channel, a single new RLC PDU is created per TTI (in addition retransmitted PDUs can be transmitted in the same TTI). This means that a maximum of one RLC sequence number is "consumed" per TTI. The RLC sequence number length for acknowledged mode RLC (AM RLC) is chosen to be 10 bits long, which is sufficiently long to avoid sequence number stalling. However, sequence number stalling can occur in selective repeat ARQ protocols since only half of the sequence number space can be outstanding (i.e., transmitted but not yet acknowledged) at any time. Moreover, as mentioned above in the Background section, if carrier aggregation is adopted in the manner illustrated in FIG. 2, then five TBs per TTI need to be transmitted (or at least 10 TBs per TTI if spatial multiplexing is used), which will exacerbate the possibility of sequence number stalling.

Thus, according to exemplary embodiments, the re-segmentation functionality in the RLC entity 52 is used to create and transmit RLC PDU segments at the time of the first (i.e., initial or original) transmission of that data by either an eNodeB 34 or a UE 36, to thereby enable the transmission of one RLC PDU segment per TB. This reduces the amount of consumed sequence numbers since all RLC PDU segments which are transmitted in a given TTI will have the same sequence number. More specifically, according to these exemplary embodiments, a number of RLC PDU segments can be created (e.g., all of the segments having the same sequence number but different segmentation offset values) prior to the first transmission of the data. The segmentation offset value indicates the starting location of each PDU segment within a given PDU sequence. For example, assuming that 10 TBs are transmitted in a TTI, the RLC entity 52 at the transmitter would, for example, create 10 RLC PDU segments, each using the same sequence number, such that one RLC PDU segment is transmitted in each TB. In this way only one sequence number is used according to this exemplary embodiment instead of 10 sequence numbers which would have been used if each TB was transmitted using its own, different sequence number.

Figure 6A:
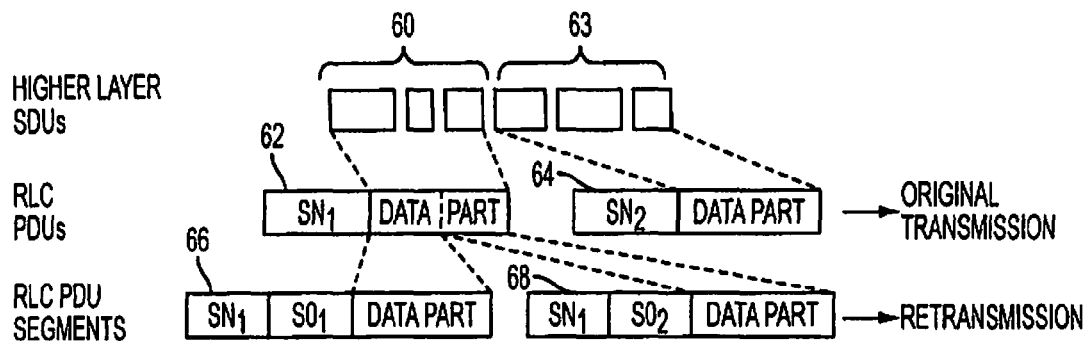
FIG. 6(a) illustrates conventional sizing of data at the radio link layer.
Figure 6B:
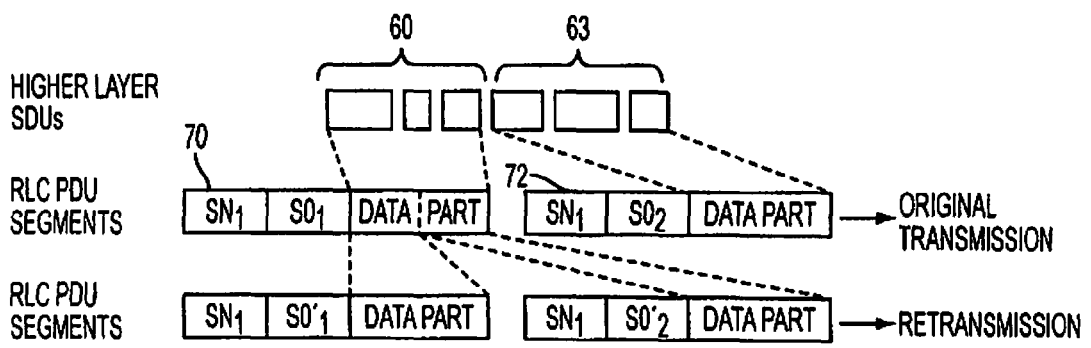
FIGS. 6(b) and 6(c) illustrate sizing of data according to exemplary embodiments.

These concepts associated with exemplary embodiments will be better understood by comparing FIG. 6(a), wherein concatenation as performed by a conventional RLC entity is shown, with FIG. 6(b), wherein concatenation according to an exemplary embodiment is illustrated. Starting with FIG. 6(a), a number of higher layer SDUs 60 are concatenated with one another by an RLC entity 52 to form the data part of an RLC PDU 62. This RLC PDU 62 is then transmitted, e.g., as part of a number of PDUs including PDU 64 which was generated based on a concatenation of the SDUs 63. It will be appreciated by those skilled in the art, that other RLC PDUs may be generated by segmenting larger SDUs into multiple RLC PDUs, although this process is not shown in FIG. 6(a). Each RLC PDU 62, 64 has its own, different sequence number (SN) assigned thereto. If, for example, RLC PDU 62 needs to be retransmitted, e.g., because the RLC entity associated with the transmitting eNodeB 34 or UE 36 has received a NACK associated with RLC PDU 64, then that RLC PDU 64 can be segmented into RLC PDU segments 66 and 68 (if needed) and subsequently retransmitted. The segments 66 and 68 have the same SN, but a different segment offset (SO)

value. Note that, for each RLC PDU which is transmitted as part of the original transmission, a different sequence number is needed and used. Thus two sequence numbers are used to transmit these two groups of SDUs 60 and 63.

Looking now at FIG. 6(b), the same SDUs 60 and 63 are shown as they can be processed in accordance with these exemplary embodiments. Therein, the first group of SDUs 60 is concatenated to form the data portion of a first RLC PDU segment 70 and the second group of SDUs 63 is concatenated to form the data portion of a second RLC PDU segment 72. It can be seen that according to this exemplary embodiment, the RLC entity 52 directly forms a number of RLC PDU segments for original transmission of SDUs without going through the intermediate step of first forming RLC PDUs as in FIG. 6(a). The RLC PDU segments 70 and 72 have the same sequence number but different sequence offset values. These RLC PDU segments 70 and 72 are then transmitted as the first (original) transmission of this data, e.g., by an eNodeB 34 or UE 36. Thus the same data that was originally transmitted in the example of FIG. 6(a) using two sequence numbers, is originally transmitted using only one sequence number in the exemplary embodiment of FIG. 6(b) by using segmentation offsets. As mentioned above, the technique shown in FIG. 6(b) can be applied in the same way for segmentation as for concatenation, e.g., splitting an SDU into multiple data parts which are carried by different RLC PDU segments having the same sequence number, but different segment offset values, for their original transmission. Generically, segmentation and concatenation are referred to jointly herein as "sizing" operations.

If an originally transmitted RLC PDU segment according to these exemplary embodiments is received erroneously, the receiver may request retransmission of that segment. For example, as shown in FIG. 6(b) if the RLC PDU segment 70 is received erroneously, the receiver may transmit a NAK message back to the transmitter requesting retransmission of the RLC PDU segment 70. In response, the transmitter may retransmit the data part associated with originally transmitted RLC PDU segment 70 as two new RLC PDU segments having the same SN as was originally used to transmit the RLC PDU segment 70, but two new segment offset values $SO'_1$ and $SO'_2$ as shown in FIG. 6(b). The number of RLC PDU segments used to perform the retransmission may vary based on, for example, the conditions of the radio channel at the time of retransmission.

Figure 6C:
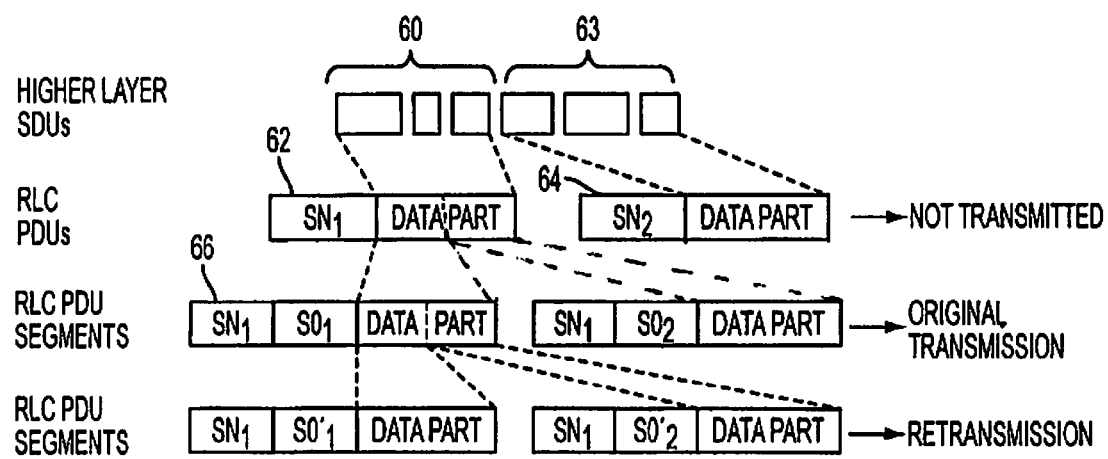

According to another exemplary embodiment, illustrated in FIG. 6(c), even when using RLC PDU segments for the original transmission of data, an RLC PDU can first be formed by the RLC entity 52 based on the amount of data that shall be transmitted. This may be useful in order to, e.g., determine to which PDU segments the same sequence number belongs and since the SO values may refer to the RLC PDU. The formation of the RLC PDUs may be as a purely logical construct or may be physically stored as chucks of data but are not transmitted as shown in FIG. 6(c). Instead, as a subsequent step, the RLC PDUs are re-segmented into corresponding RLC PDU segments for original transmission. If retransmission is needed, it can be performed as described above with respect to FIG. 6(c).

Figure 7:
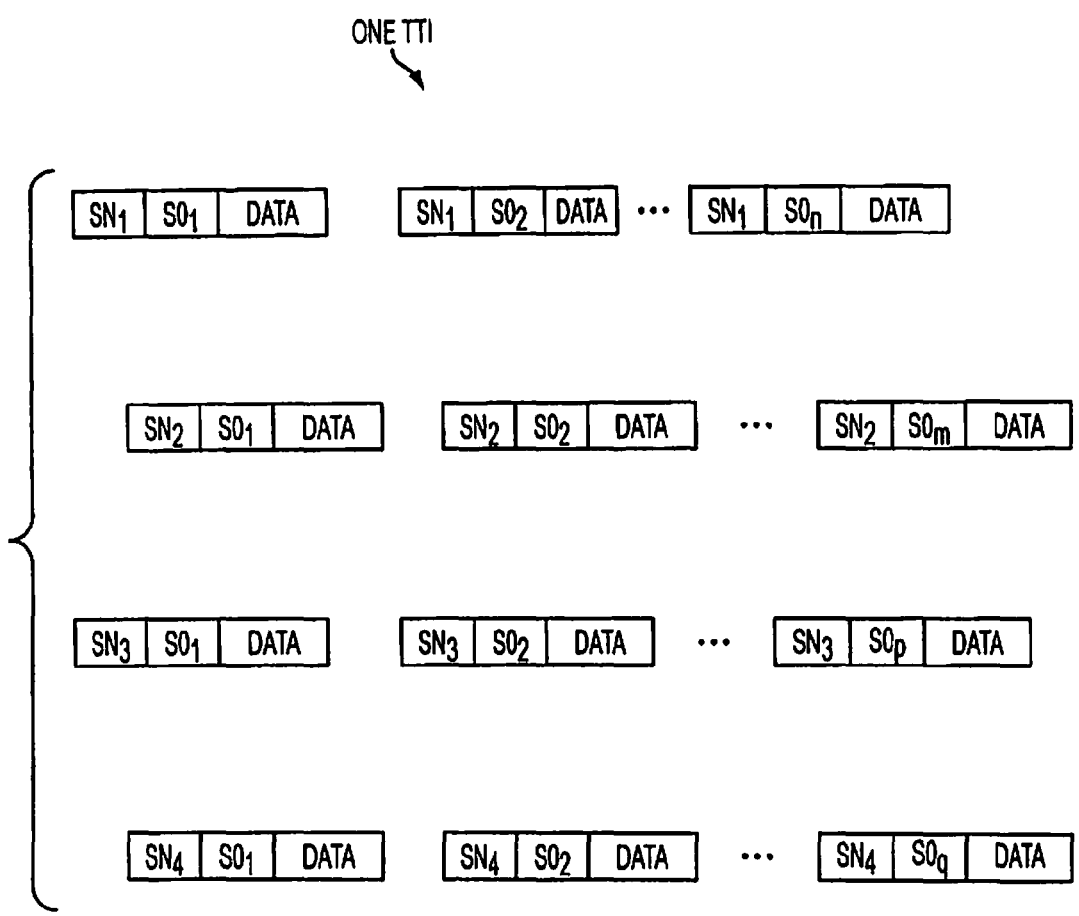
FIG. 7 depicts sizing of data according to another exemplary embodiment.

To achieve a bit rate of 1 Gbps, and to provide backward compatibility as mentioned above, and assuming that 1 TTI corresponds to 1 ms, 125 Kbytes need to be transmitted per TTI according to this exemplary carrier aggregation embodiment. However, the current segmentation offset values in existing RLC entities 52 are 15 bits in size, which can therefore only indicate values up to 32 Kbytes. One way to address this issue is to increase the size of the segmentation offset values from 15 bits to, e.g., 17 bits. However, it may be unattractive to increase the size of the segmentation offset field in the RLC protocol. Accordingly, another way to support these very high bitrates without modifying the size of the segmentation offset values is to create a number of RLC PDU segments for use in the original transmission of data in a TTI, but to avoid that the segmentation offset needs to indicate values larger than 32 Kbyte. For example, if a total of 125 Kbyte is transmitted in a TTI the transmitter can, for example, use 4 RLC sequence numbers such that the created RLC PDU segments correspond to 4 separate RLC PDUs of 32 Kbyte each (in such an example the RLC PDUs would typically not be transmitted; only the corresponding RLC PDU segments). An example of this embodiment is illustrated as FIG. 7, where the number of RLC PDU segments (n, m, p and q) associated with each of the four sequence numbers may be the same or may be different for a given TTI.

Other variations are contemplated. For example, since the RLC PDU segment header is slightly larger than the normal RLC PDU header, the foregoing exemplary embodiments will slightly increase signaling overhead. Thus, according to another exemplary embodiment, the foregoing techniques may be used only some of the time, e.g., when there is a perceived risk of SN stalling. For example, the transmitter could determine whether to use RLC PDU segments for original transmission based on the currently used SN space for that transmitter, e.g., a predetermined SN usage threshold could be provided at the transmitter which, when exceeded, could trigger the usage of RLC PDU segments for original transmissions instead of RLC PDUs. For example, the threshold could be set to 256 of 1024 SN. If more than 256 RLC PDUs are outstanding, it would be triggered that RLC PDU segments are used for original transmissions. Alternatively, if more than a certain number of SNs are needed to transmit data in a particular TTI, e.g., if 4 SNs are needed, then RLC PDU segments could be used instead of RLC PDUs for that particular, original transmission. This latter alternative could also be combined with the SN space threshold, e.g., RLC PDU segments could be used for original transmission if more than a predetermined number of SNs are needed for transmitting RLC PDUs in a particular TTI and if a predetermined number of SNs are in use for that transmitter's SN space. Moreover, the present invention is not limited to these various alternatives for determining when to switch in (or out) original transmissions via RLC PDU segments, as other techniques may be used instead. Thus, according to this exemplary embodiment, a transmitter may transmit original data using RLC PDUs during a first period of time and may later transmit original data using RLC PDU segments during a second period of time, e.g., after it is determined that the likelihood of sequence stalling has increased above a threshold value. Similarly, a transmitter may transmit original data using RLC PDU segments during a first period of time and may later transmit original data using RLC PDUs during a second period of time, e.g., after it is determined that the likelihood of sequence stalling has fallen below a threshold value.

Figure 8:
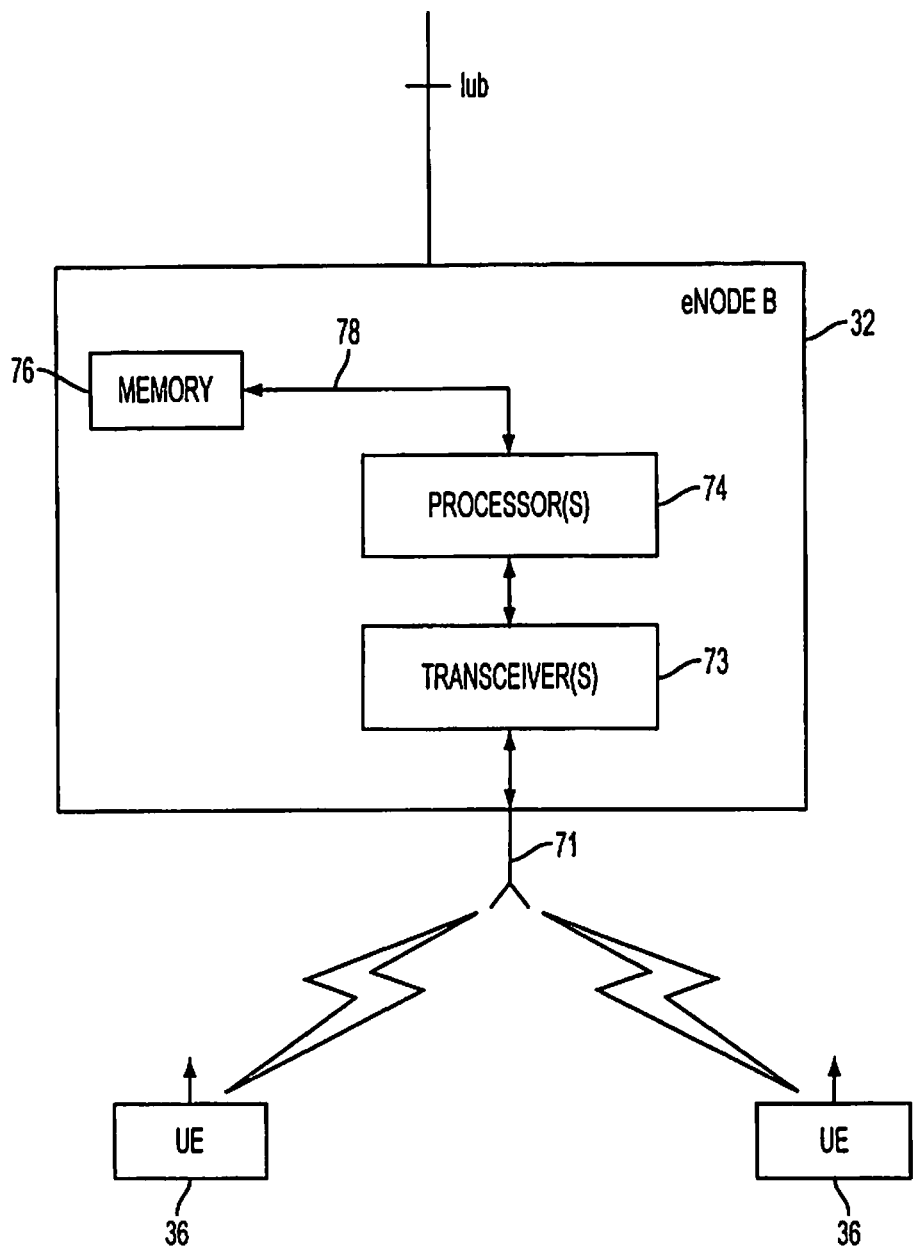
FIG. 8 shows a communications node according to an exemplary embodiment.

An exemplary base station 32, e.g., an eNodeB, which receives or transmits RLC PDU segments as original data transmissions is generically illustrated in FIG. 8. Therein, the eNodeB 32 includes one or more antennas 71 connected to processor(s) 74 via transceiver(s) 73. The processor 74 is configured to analyze and process signals received over an air interface via the antennas 71, as well as those signals received from core network node (e.g., access gateway) via, e.g., an S1 interface. The processor(s) 74 may also be connected to one or more memory device(s) 76 via a bus 78. Further units or functions, not shown, for performing various operations as encoding, decoding, modulation, demodulation, encryption, scrambling, precoding, etc. may optionally be implemented not only as electrical components but also in software or a combination of these two possibilities as would be appreciated by those skilled in the art to enable the transceiver(s) 72 and processor(s) 74 to process uplink and downlink signals. A similar, generic structure, e.g., including a memory device, processor(s) and a transceiver, can be used (among other things) to implement communication nodes such as UEs 36.

Figure 9:
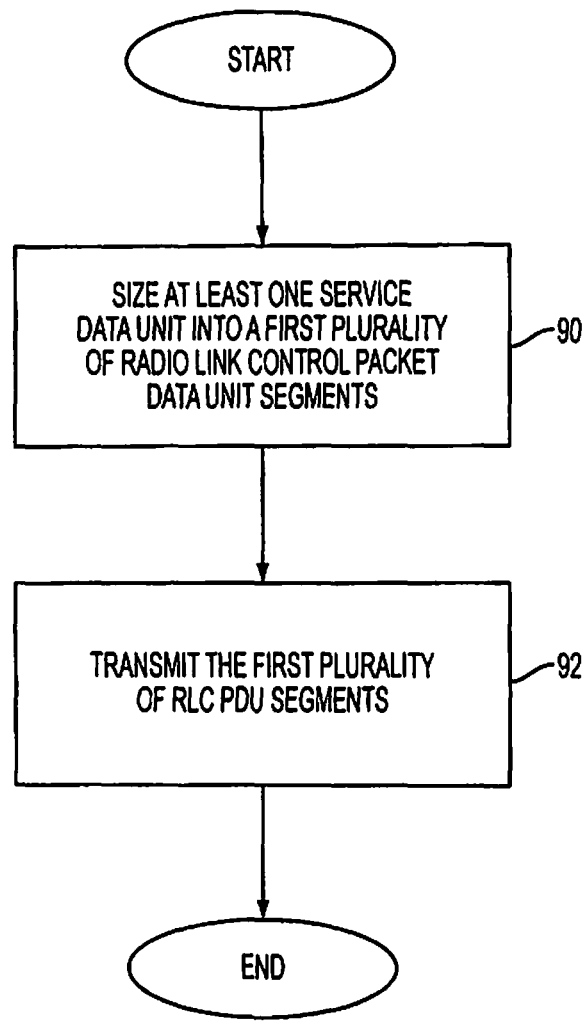
FIGS. 9 and 10 are flowcharts illustrating methods of communicating according to exemplary embodiments.
Figure 10:
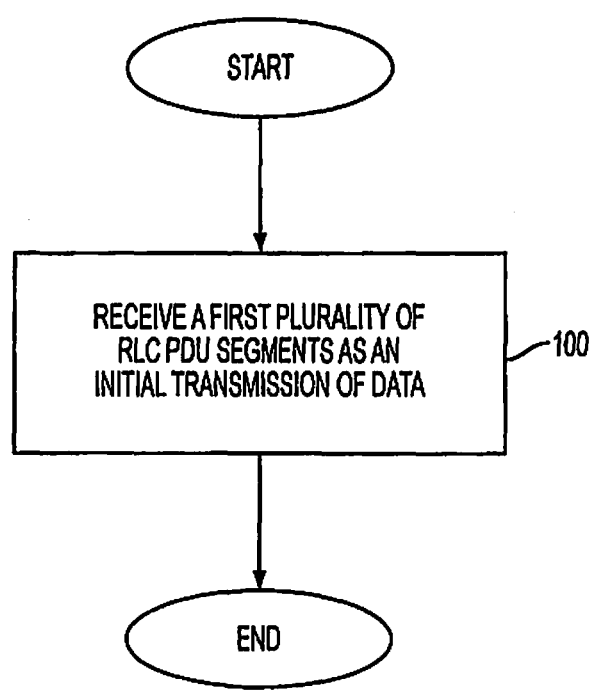

Thus, a method for communicating in a network according to an exemplary embodiment includes the steps illustrated in the flowchart of FIG. 9. Therein, a first plurality of service data units, SDUs, are sized (e.g., segmented and/or concatenated) into a first plurality of radio link control, RLC, protocol data unit, PDU, segments for the initial transmission of that data at step 90. Then, the first plurality of RLC PDU segments are transmitted at step 92. Similarly, in FIG. 10, another method for communicating in a network includes the step 100 of receiving a first plurality of radio link control, RLC, protocol data unit, PDU, segments as an initial transmission of data.

Based on the foregoing, it will be apparent that these exemplary embodiments provide for flexible usage of resegmentation to, among other things, address SN space issues. In order for the receiver to recognize whether incoming transmissions are formatted as RLC PDUs or RLC PDU segments, a resegmentation flag can be provided in the header information. The resegmentation flag indicates how to interpret the header bits that are provided after the SN field. When the resegmentation field is set to 1, this indicates that the data unit is an RLC PDU segment and that one of the following header fields provide the corresponding SO information. When it is unset, the resegmentation flag indicates that the data unit is an RLC PDU and that no SO information is provided.

The above-described exemplary embodiments are intended to be illustrative in all respects, rather than restrictive, of the present invention. For example, although the exemplary embodiments described above provide techniques whereby one SN and multiple sequence offsets are used to transmit RLC PDU segments in each TTI, it is also possible to use resegmentation for original transmission wherein one SN is used across multiple TTIs, e.g., transmitting one RLC PDU segment per TTI with the same SN but different SOs. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

The invention claimed is:

1. A method for communicating in a network comprising:
   sizing at least one service data unit, SDU, into a first plurality of radio link control, RLC, protocol data unit, PDU, segments for an initial transmission of said at least one SDU;
   assigning a same sequence number for use in the initial transmission, by at least two RLC PDU segments among the first plurality of RLC PDU segments, wherein said at least two RLC PDU segments include different segment offset values, respectively;
   determining that likelihood of sequence number stalling has exceeded a certain threshold value, wherein sequence number stalling occurs when more than a predetermined number of sequence numbers is outstanding; and
   transmitting said at least two RLC PDU segments among the first plurality of RLC PDU segments in a transmission time interval, TTI, together with a remainder of the RLC PDU segments of the first plurality of RLC PDU segments, wherein the first plurality of RLC PDU segments are transmitted in response to the determining step,
   wherein an amount of sequence numbers used for the first plurality of RLC PDU segments is based on an amount of data transmitted in the TTI.

2. The method of claim 1, wherein said step of sizing further comprises:
   sizing said at least one service data unit, SDU, into at least one radio link control, RLC, protocol data unit, PDU, and
   re-segmenting each of the at least one RLC PDUs into said first plurality of RLC PDU segments for the initial transmission of said at least one SDU.

3. The method of claim 1, further comprising:
   receiving an indication that at least one of said first plurality of RLC PDU segments needs to be retransmitted; and
   retransmitting said at least one of said first plurality of RLC PDU segments.

4. The method of claim 1, further comprising:
   assigning at least one different sequence number for use in the initial transmission, during the TTI, by at least one among said first plurality of RLC PDU segments, wherein each of said at least one among said first plurality of RLC PDU segments which uses a same one among said at least one different sequence number also includes a different segment offset value.

5. The method of claim 1, further comprising:
   assigning a same sequence number for use in an initial transmission of a second plurality of RLC PDU segments during a plurality of different transmission time intervals, TTIs, wherein each of said second plurality of RLC PDU segments also includes a segment offset value different from segment offset values of any other among said second plurality of RLC PDU segments.

6. The method of claim 1, further comprising:
   determining that a likelihood of sequence number stalling has dropped below a threshold value;
   sizing a second at least one SDU into at least one RLC PDU for initial transmission; and
   transmitting said at least one of RLC PDUs.

7. The method of claim 1, wherein said step of sizing further comprises:
   directly sizing said at least one service data units, SDU, into said first plurality of radio link control, RLC, protocol data unit, PDU, segments without first sizing said at least one SDU into at least one RLC PDU.

8. The method of claim 1, wherein said first plurality of RLC PDU segments each include a resegmentation flag which is set to a value of one.

9. A communications node comprising:
   a processor adapted
      to size at least one service data unit, SDU, into a first plurality of radio link control, RLC, protocol data unit, PDU, segments for an initial transmission of said at least one SDU, and
      to assign a same sequence number for use in the initial transmission, to at least two RLC PDU segments among the first plurality of RLC PDU segments, said at least two RLC PDU segments including different segment offset values, respectively;
   a transceiver, connected to said processor, adapted to transmit said at least two RLC PDU segments among the first plurality of RLC PDU segments in a transmission time interval, TTI, together with a remainder of the RLC PDU segments of the first plurality of RLC PDU segments, wherein an amount of sequence numbers used for the first plurality of RLC PDU segments is based on an amount of data transmitted in the TTI;

wherein said processor is further adapted to determine that a likelihood of sequence number stalling has exceeded a certain threshold value and to then transmit said first plurality of RLC PDU segments in response to said determination, wherein sequence number stalling occurs when more than a predetermined number of sequence numbers is outstanding; and a memory device, connected to said processor, adapted to store said first plurality of RLC PDU segments.

10. The communications node of claim 9, wherein said processor is further configured to size said at least one service data unit, SDU, into at least one radio link control, RLC, protocol data unit, PDU, and to re-segment each of the at least one RLC PDUs into said first plurality of RLC PDU segments for the initial transmission of said at least one SDU.

11. The communications node of claim 9, wherein said processor is further adapted to receive an indication that at least one of said first plurality of RLC PDU segments needs to be retransmitted; and wherein said transceiver is further adapted to retransmit said at least one of said first plurality of RLC PDU segments.

12. The communications node of claim 9, wherein said processor is further adapted to assign at least one different sequence number for use in the initial transmission during the TTI, by at least one among said first plurality of RLC PDU segments, wherein each of said at least one among said first plurality of RLC PDU segments which uses a same one among said at least one different sequence number also includes a different segment offset value.

13. The communications node of claim 9, wherein said processor is further adapted to assign a same sequence number for use in an initial transmission of a second plurality of RLC PDU segments during a plurality of different transmission time intervals, TTIs, wherein each of said second plurality of RLC PDU segments also includes a segment offset value different from segment offset values of any other among said second plurality of RLC PDU segments.

14. The communications node of claim 9, wherein said processor is further adapted to determine that a likelihood of sequence number stalling has dropped below a threshold value and to then size a second at least one SDU into at least one RLC PDU for initial transmission; and wherein said transceiver is further adapted to transmit said at least one RLC PDU.

15. The communications node of claim 9, wherein said processor is further adapted to directly size said at least one service data unit, SDU, into said first plurality of radio link control, RLC, protocol data unit, PDU, segments without first sizing said at least one SDU into at least one RLC PDU.

16. The communications node of claim 9, wherein said first plurality of RLC PDU segments each include a resegmentation flag which is set to a value of one.

17. The communications node of claim 9, wherein said communications node is a user equipment.

18. The communications node of claim 9, wherein said communications node is a base station.

19. A method for communicating in a network comprising:
receiving a first plurality of radio link control, RLC, protocol data unit, PDU, segments as an initial transmission of data, in a transmission time interval, TTI, together with a remainder of the RLC PDU segments of the first plurality of RLC PDU segments, wherein at least two RLC PDU segments among the first plurality of RLC PDU segments use a same sequence number and include different offset values, respectively wherein an amount of sequence numbers used for the first plurality of RLC PDU segments is based on an amount of data transmitted in the TTI, wherein the received first plurality of RLC PDU segments are transmitted in response to a determination that a likelihood of sequence number stalling has exceeded a certain threshold value, wherein sequence number stalling occurs when more than a predetermined number of sequence numbers is outstanding.

20. The method of claim 19, further comprising:
transmitting an indication that at least one of said plurality of RLC PDU segments needs to be retransmitted; and
receiving a retransmission of said at least one of said plurality of RLC PDU segments.

21. The method of claim 19, further comprising:
receiving RLC PDU segments among said plurality of RLC PDU segments using a different sequence number during the TTI, wherein each of said received RLC PDU segments which uses the different sequence number also includes a different segment offset value.

22. The method of claim 19, further comprising:
receiving a second plurality of RLC PDU segments during a plurality of different transmission time intervals, TTIs, wherein each of said second plurality of RLC PDU segments uses a same sequence number and includes a segment offset value different from segment offset values of any other among said second plurality of RLC PDU segments.

23. The method of claim 19, wherein said first plurality of RLC PDU segments each include a resegmentation flag which is set to a value of one.

24. A communications node comprising:
a transceiver adapted to receive a first plurality of radio link control, RLC, protocol data unit, PDU, segments as an original transmission of data in a transmission time interval, TTI, together with a remainder of the RLC PDU segments of the first plurality of RLC PDU segments, wherein at least two RLC PDU segments among the first plurality of RLC PDU segments use a same sequence number and include different offset values, respectively, and wherein an amount of sequence numbers used for the first plurality of RLC PDU segments is based on an amount of data transmitted in the TTI;
a memory device adapted to store said first plurality of RLC PDU segments; and
a processor, connected to said transceiver and said memory device, adapted to repackage said RLC PDU segments into output data,
wherein the received first plurality of RLC PDU segments are transmitted in response to a determination that a likelihood of sequence number stalling has exceeded a certain threshold value, wherein sequence number stalling occurs when more than a predetermined number of sequence numbers is outstanding.

25. The communications node of claim 24, wherein said processor is further adapted to determine that at least one of said plurality of RLC PDU segments needs to be retransmitted; and wherein said transceiver is further adapted to transmit a request for retransmission of said at least one of said plurality of RLC PDU segments.

26. The communications node of claim 24, wherein said transceiver is further adapted to receive RLC PDU segments among said plurality of RLC PDU segments using a different sequence number for said data during the TTI, wherein each of said received RLC PDU segments which uses the different sequence number also includes a different segment offset value.

27. The communications node of claim 24, wherein said transceiver is further adapted to receive a second plurality of RLC PDU segments using a same sequence number for said data during a plurality of different transmission time intervals, TTIs, wherein each of said second RLC PDU segments includes a segment offset value different from segment offset values of any other among said second plurality of RLC PDU segments.

28. The communications node of claim 24, wherein said first plurality of RLC PDU segments each include a resegmentation flag which is set to one.

* * * * *